United States Patent [19]

Young et al.

[11] 4,359,305
[45] Nov. 16, 1982

[54] METHOD AND APPARATUS FOR ACCUMULATING AND DISPENSING TRAY-LIKE OBJECTS

[75] Inventors: Roy E. Young, Enumclaw; Douglas K. Stricklin, Federal Way, both of Wash.

[73] Assignee: Weyerhaeuser Company, Tacoma, Wash.

[21] Appl. No.: 100,324

[22] Filed: Dec. 5, 1979

[51] Int. Cl.³ ..................... B65G 57/30; B65G 59/06
[52] U.S. Cl. ..................................... 414/43; 414/96; 414/126
[58] Field of Search ............ 414/125, 126, 127, 131, 414/92, 95, 96, 35, 37, 43; 221/254, 297, 301

[56] References Cited

U.S. PATENT DOCUMENTS

| | | | |
|---|---|---|---|
| 2,538,734 | 1/1951 | Patterson | 414/96 X |
| 2,792,950 | 5/1957 | Fenton et al. | 414/96 |
| 2,854,153 | 9/1958 | Rydberg et al. | |
| 2,978,125 | 4/1961 | Freeman | 414/96 X |
| 3,025,057 | 3/1962 | Dale et al. | |
| 3,233,891 | 2/1966 | Denton et al. | |
| 3,583,579 | 6/1971 | Triggs et al. | 414/96 X |
| 3,858,732 | 1/1975 | Kemper | 414/95 X |

FOREIGN PATENT DOCUMENTS 1179561  1/1970  United Kingdom ................ 414/126

Primary Examiner—Leslie J. Paperner

[57] ABSTRACT

This invention is an apparatus and method for accumulating or dispensing planar tray-like objects which are being received from or supplied to a conveyor system. It consists of a supporting frame on which there is an elevator. The elevator has a table on which there are transport rails or rolls compatible with the rest of the system in which the accumulating and dispensing apparatus is operating. The apparatus also contains a plurality of tray-retainers which are mounted on the frame and are normally located some distance above the plane in which the elevator table is in line with the external transport system. As trays or similar objects are received into the apparatus they are lifted one at a time by the elevator onto the bottom of an accumulating stack. The lowest tray of the stack is held by the tray-retainers while the higher members of the stack rest by gravity on the lowest tray. When a stack of the desired size is accumulated it may be released as a unit from the apparatus. The apparatus functions similarly when dispensing trays. A preformed stack is placed in the apparatus and is lifted by the elevator where it is held by the retainers. A release mechanism associated with the elevator releases trays one at a time from the bottom of the stack onto the elevator. When the elevator is dropped to its normal position the tray may be moved out onto the external transport system where it is ready for use. The apparatus may also be used to maintain an inventory of trays on a conveyor line where flow is sporadic so that trays may be delivered at a desired rate, when this might be different from the rate at which they were supplied from a source.

8 Claims, 22 Drawing Figures

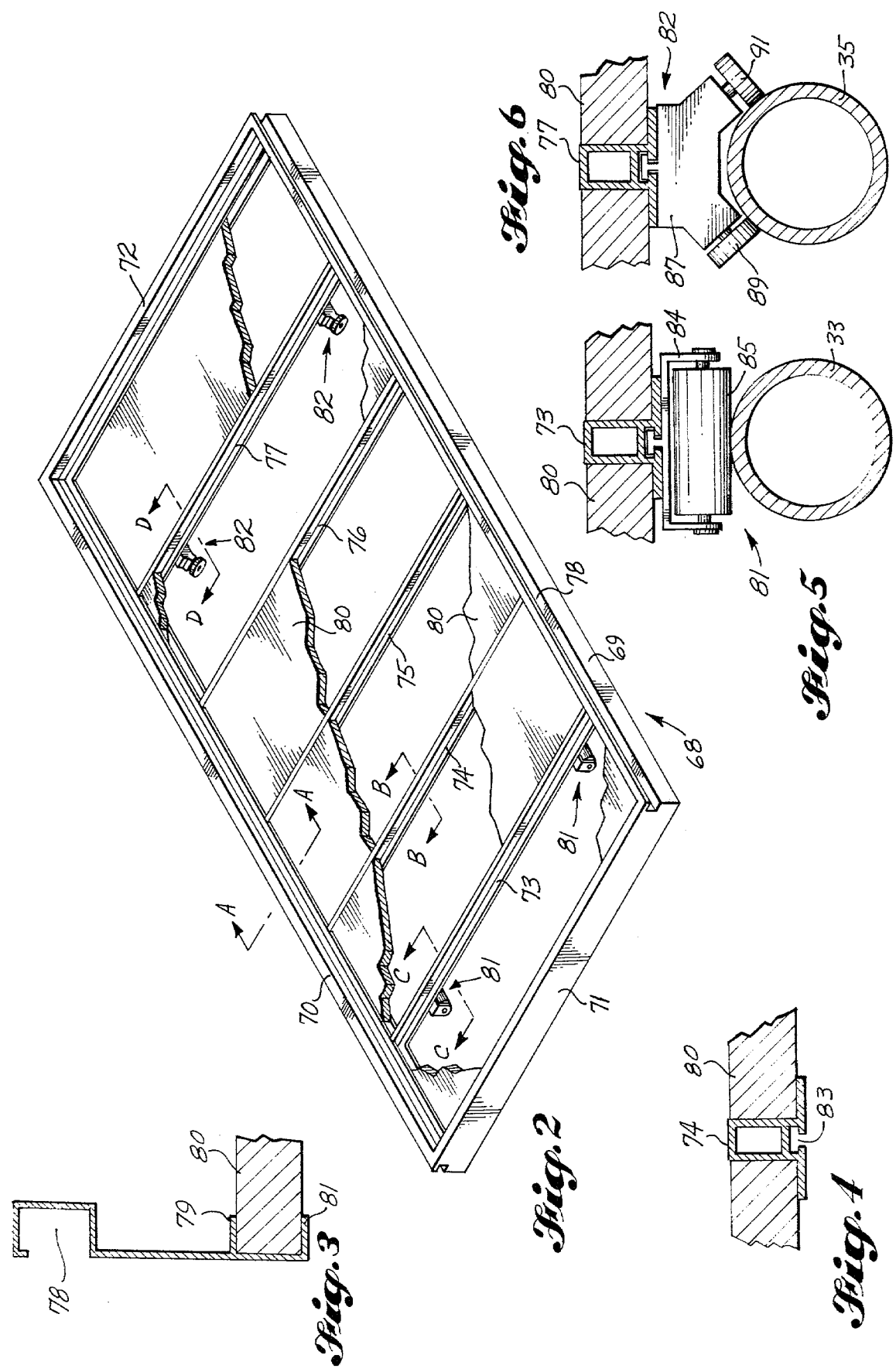

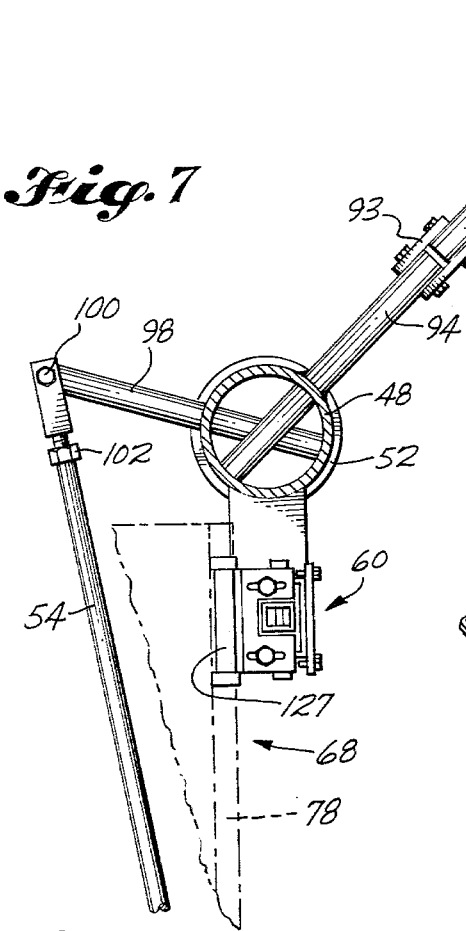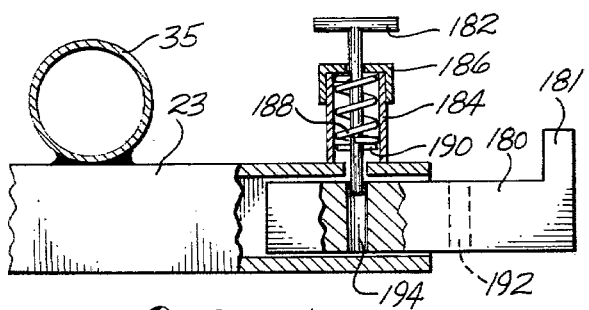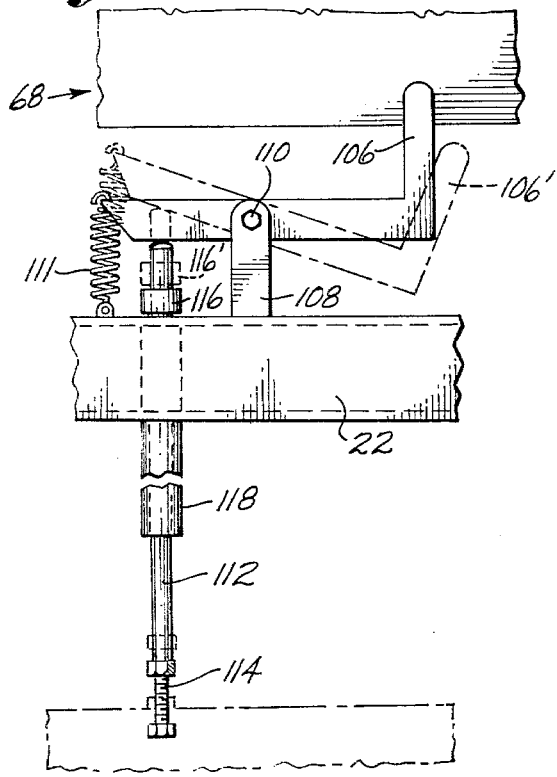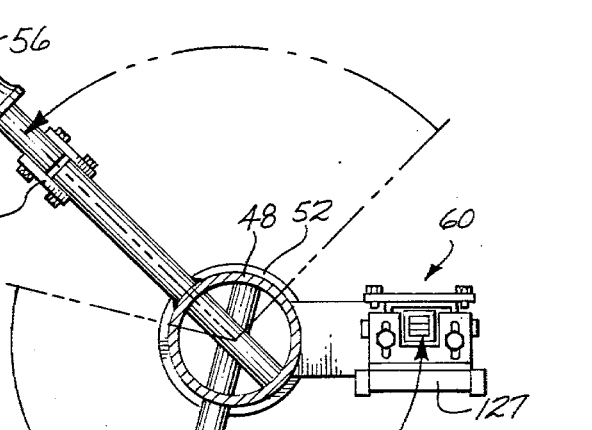

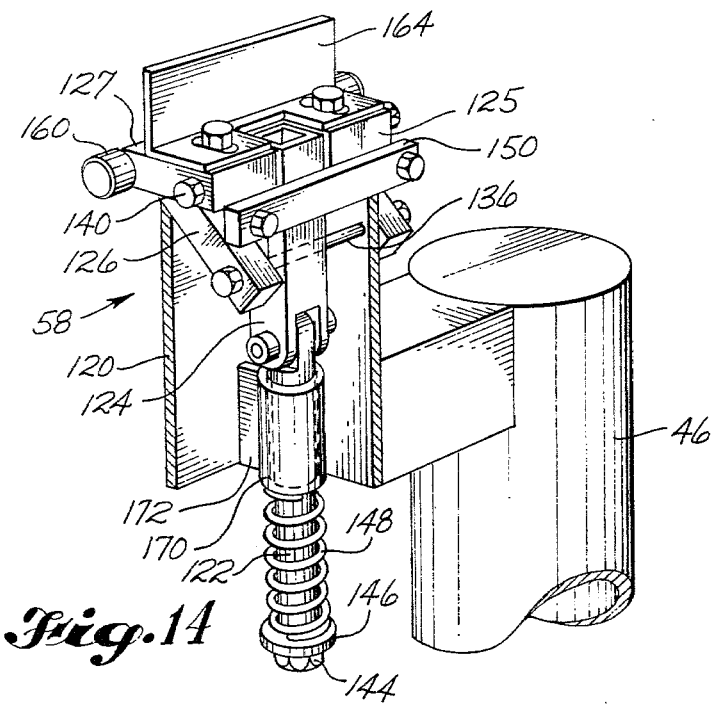
Fig. 14
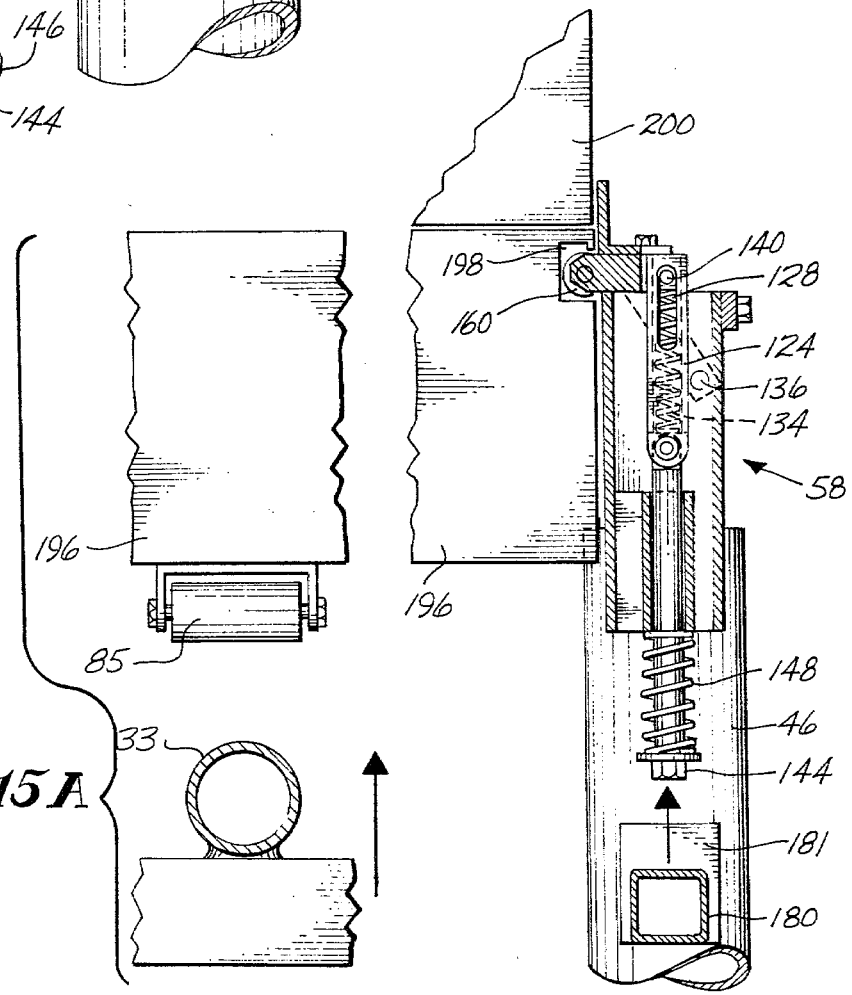
Fig. 15A
Fig. 15B

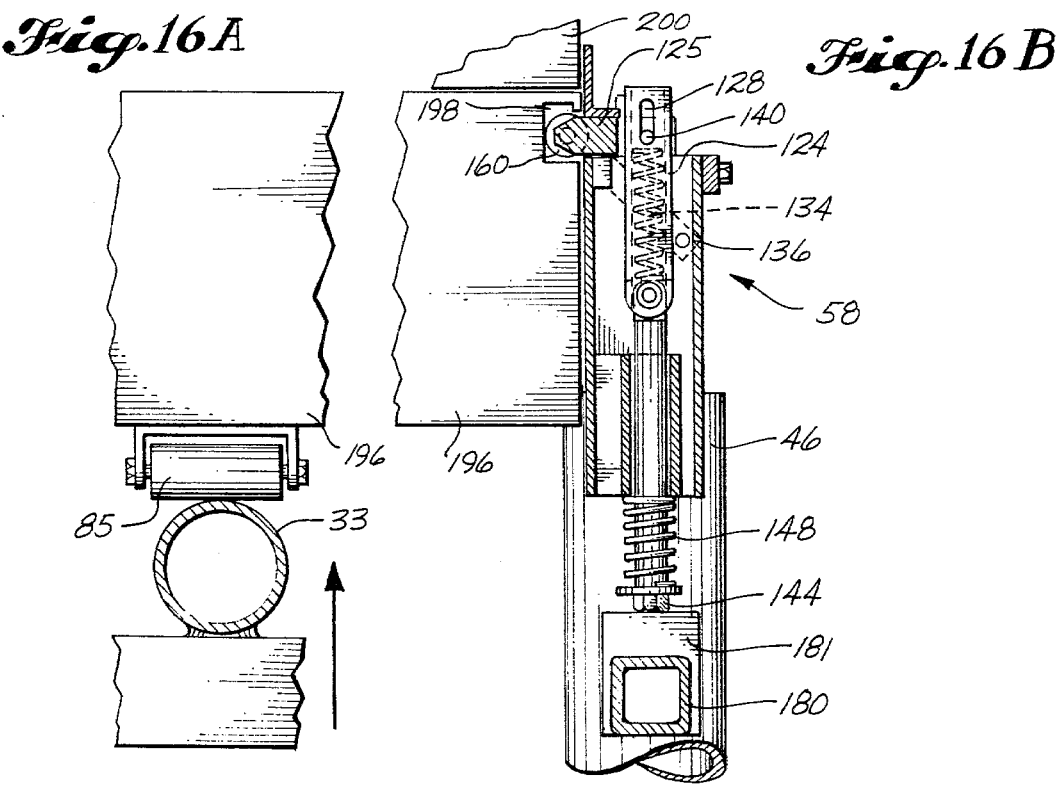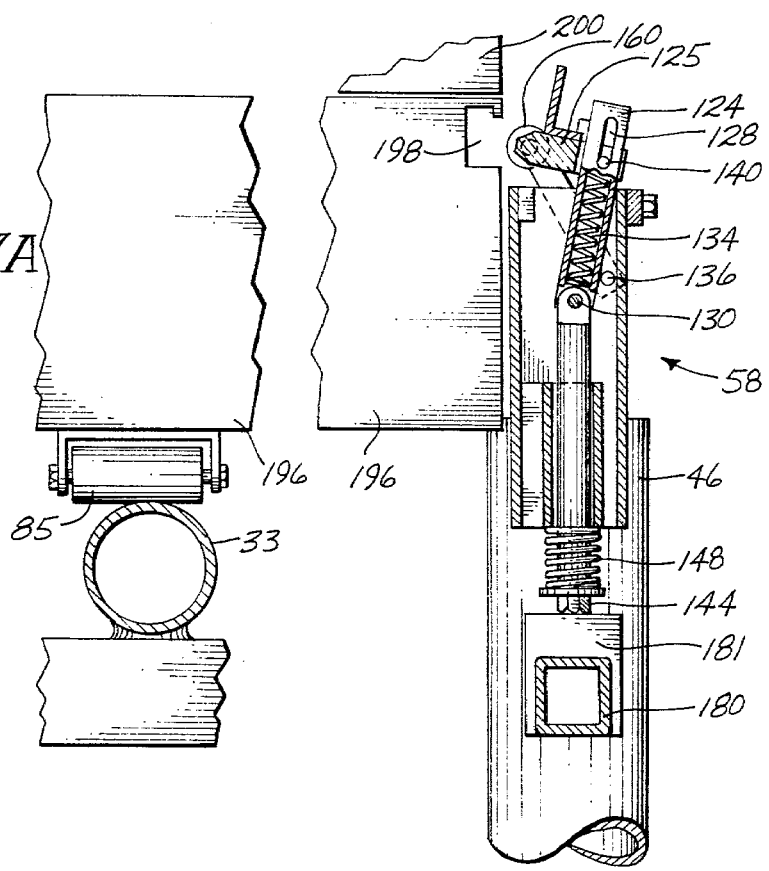

4,359,305

METHOD AND APPARATUS FOR ACCUMULATING AND DISPENSING TRAY-LIKE OBJECTS

BACKGROUND OF THE INVENTION

This invention relates to the method and apparatus for accumulating individual incoming planar tray-like objects into a stack, or for individually dispensing said objects from a preaccumulated stack.

There are many instances in the prior art when it has been found desirable to accumulate planar objects into a stack, as for packaging and shipping the objects. In other operations it is found desirable to dispense individual planar objects from a preformed stack. As one example, U.S. Pat. No. 3,233,891 might be cited. This apparatus is for accumulating individual sheets of plywood as they depart from a conveyor belt into packages of predetermined size for subsequent banding and shipping. This device had to deal with the problem of continuing to form these unit-sized stacks as the sheets continued in uninterrupted fashion from the conveyor line.

In many cases stacking or unstacking of planar or tray-like units has been done manually. An instance of this is in plant nurseries where potted plants of various types are grown for sale. The pots are contained in the greenhouses on large trays or tables, roughly five by ten feet in outside dimensions. These trays or tables have rollers on the bottom and are handled within the greenhouse by a transport means which normally comprises a set of rails. After the plants have grown to the appropriate size and are ready for sale, the trays or tables are handled as a unit and rolled along the transport system to the shipping area of the nursery. Here the potted plants are removed and otherwise packaged for shipping. The empty tables or trays are normally cleaned and stacked by hand. These stacks are then transported by truck or other means to the receiving end of the greenhouse where newly potted plants are placed on them for growth. While these trays are not heavy, because of their large dimensions they are awkward and require at least two people for handling. This creates the problem of increased labor costs in an industry which is fiercely competitive and often of low profitability. Many other materials-handling situations in which objects are transported on tray-like surfaces which must ultimately be returned to a point of origin could be cited with equal ease.

SUMMARY OF THE INVENTION

The present invention is a method and apparatus for handling tray-like objects that are either being received one at a time and stacked or dispensed from a preexisting stack. The trays which may be handled by the present apparatus are not limited as to specific form, size or shape. The only requirement is that they have a shoulder which would normally comprise either a groove or appropriately located indentations in opposing outer sides. It is within the scope of the invention to consider the grooves in a negative sense; i.e., as bars, studs or flanges protruding from the sides of the trays. The lower edge of such bar, stud or flange is the full functional equivalent of the upper edge of a groove. Neither the grooves or bars have to be continuous in the sense of extending the full width of the trays. They are necessary only in the area where they will be engaged by the tray-retaining means. There is no requirement implied for the sides of the trays to be flush. Thus, shoulder is defined for the purpose of this invention as a continuous or discontinuous indentation or protrusion of sufficient depth or width to be engaged by the tray-retaining means.

The apparatus comprises a frame which supports an elevator means and plurality of tray-retaining means. An incoming tray is positioned on the elevator means where it is raised and added to the bottom of the forming stack of trays. Here it is held by the tray-retaining means until another tray is added to the bottom of the stack and similarly retained. The upper trays of the stack simply rest by gravity on the lowest tray which is held by the tray-retaining means.

When the apparatus is used for dispensing trays, a preexisting stack is rolled in on the transport means and appropriately positioned on the elevator table. This is then raised by the elevator so that an appropriate lower tray is engaged by the tray-retaining means. A release mechanism functioning with the elevator serves to transfer trays individually onto the elevator where they are dropped to a level so they can be dispensed on the transport means to the point of need. The release mechanism holds the tray-retaining means clear of the tray until it has dropped sufficiently so that the groove or bar will not be reengaged.

Although it would not normally be used in this fashion, the apparatus can also be used to accumulate inventory in a moving line of trays as, for example, when flow rates were sporadic. It could thus receive trays from an upstream location, store them temporarily, and dispense them when needed to a downstream location.

It is an object of this invention to provide an apparatus that can accumulate or dispense trays moving on a conveyor system.

It is another object of this invention to provide an apparatus that can accumulate or dispense trays of awkward or ungainly size with a minimal involvement of labor.

It is a further object to provide a tray-accumulating and dispensing apparatus which is mechanically simple and is relatively inexpensive to construct.

It is yet another object to provide an apparatus and method which eliminates most of the hand labor in handling large tray-like objects.

It is still another object to provide an apparatus and method for handling large and awkward trays in a safe and efficient manner.

These and other objects will become apparent to one skilled in the art after referring the following description and attached drawings.

BRIEF DESCRIPTION OF THE DRAWINGS

FIG. 2 is an isometric view from slightly above of a typical tray in which portions of the base have been cut away to reveal detail.

FIG. 3 is a cross section through line A—A of FIG. 2 showing detail of the longitudinal frame member including the handling slot.

FIG. 4 is a cross sectional view along line B—B of FIG. 2 showing detail of the T-bar supporting the tray base.

FIG. 5 is a cross sectional view along line C—C of FIG. 2 showing detail of the flat roller riding on a transport rail.

FIG. 6 is a cross sectional view along line D—D of FIG. 2 showing detail of the inverted Y roller riding on a transport rail.

FIG. 7 is a top view in partial section of the mechanism for rotating the tray retaining means into position. A tray engaged by the means is shown in phantom view.

FIG. 8 is a view similar to FIG. 7 in which the tray retaining means is rotated out of the way to allow entry or exit of a stack of trays, shown in phantom view.

FIG. 9 is an elevation view of the elevator table tray stop means.

FIG. 10 is a view in partial section of the retractable lug means which determines whether trays are stacked or dispensed.

FIG. 14 is a partially cutaway isometric view of the assembled tray-retaining means in place on one of the upper corner posts.

FIGS. 15A and 15B are the first of a sequence showing the release of a tray from the retaining means. View A is a fragmentary, partial section view showing the relative position of one transport rail and a tray roller. View B is a partially cutaway elevation view taken at 90 degrees to View A showing a tray to be released in place on the retaining means.

FIGS. 16A and 16B are a pair of views similar to those of FIG. 15 showing the next phase of the tray-releasing sequence.

FIGS. 17A and 17B are a pair of views similar to those of FIG. 15 showing the point in a sequence at which the tray has just been released from the retaining means.

DESCRIPTION OF THE PREFERRED EMBODIMENTS

The following description will use the example in which the tray-accumulating and dispensing apparatus is handling growing trays in a plant nursery. It is to be understood that this use is only exemplary and is not to be construed as limiting in any way.

Figure 1:
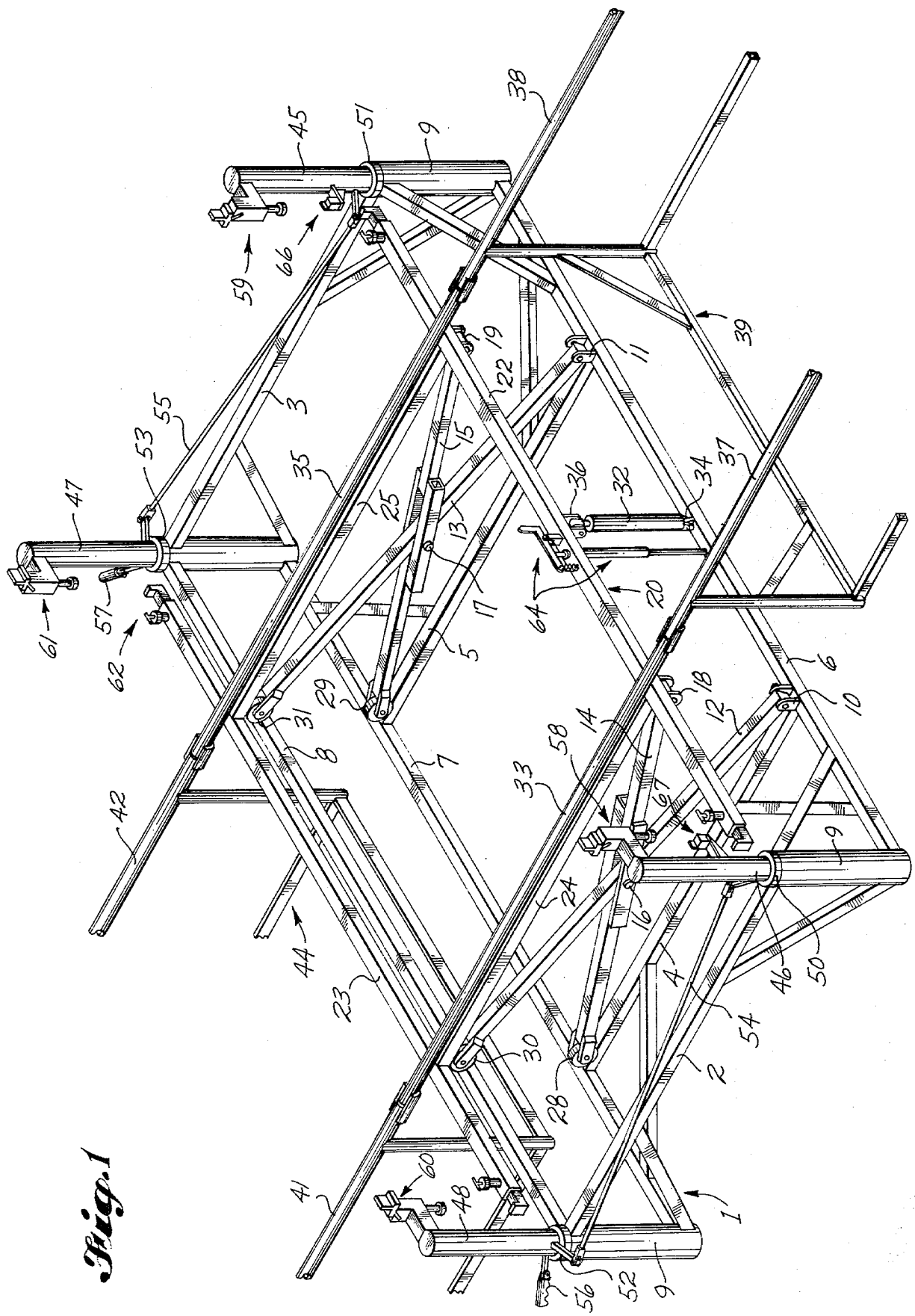
FIG. 1 is an isometric view from slightly above the tray-accumulating and dispensing apparatus.

Referring now to FIG. 1, the apparatus is displayed in a general view without any trays in place. The numeral 1 indicates a general view of the main frame of the apparatus. This is a welded fabrication comprising external longitudinal members 2, 3; lower internal longitudinal members 4, 5; and transverse members 6, 7, 8. These are assembled to four lower corner posts, each indicated as 9, with appropriate corner bracing. The frame carries an elevator means which, in this case, comprises a scissors lift. Other functionally equivalent elevator mechanisms, such as hydraulic, are considered within the scope of the invention. Lower clevis members 10 and 11 are welded to transverse member 6 of the frame. First arms 12, 13 of the scissors lift are loosely pinned in the lower clevis members. Second arms 14, 15 of the scissors lift fit into upper clevis attachments 18, 19 which are welded to transverse member 22 of the elevator table. The elevator table is shown generally as 20. It comprises transverse members 22, 23 and longitudinal members 24, 25 which form a rigid weldment. The distal ends of the first and second scissors lift arms terminate in rollers 28, 29, 30, and 31. These travel respectively along the internal longitudinal members 4, 5 of the main frame and the longitudinal members 24, 25 of the elevator table. These members may be flanged if desired to retain the wheels. Rails 33 and 35, comprising a transport means for the trays, are fixed to the upper side of table longitudinal members 24 and 25. The elevator table is raised by hydraulic cylinder 32 which is attached to the main frame at the bottom by clevis arrangement 34 and to the elevator table at the top by clevis arrangement 36. The cylinder is powered by an appropriate hydraulic power supply and control system which are not shown. On one side of the apparatus, rails 33 and 35 engage external rails 37 and 38, generally supported on framework 39. On the other side, the accumulating and dispensing apparatus rails engage greenhouse rails 41 and 42 generally supported on framework 44. These external rails are a part of normal greenhouse equipment and form no part of the present invention. They are used as a system for moving empty or loaded trays from place to place within the greenhouse. Upper corner posts 45, 46, 47, and 48 are telescoped for a distance within the lower corner posts 9. They are supported on the top of the lower corner posts by flanges 50, 51, 52, 53 which are fixed to the upper posts. The two corner posts on each side of the apparatus are tied together by corner post linkages 54 and 55. Handles 56 and 57 are attached to upper corner posts 47, 48 for rotating them out of the way of an incoming or outgoing stack of trays. In the embodiment shown, both posts on one side of the apparatus will rotate outwardly when the handle is turned. It is a simple matter for one skilled in the art to design a linkage system so that all four corner posts are appropriately rotated from one handle. At the upper part of each corner post is a tray-retaining means generally indicated in this drawing as 58, 59, 60 and 61. The tray-retaining means should be located high enough to allow clearance under any stored trays for at least one tray on the transport means when the elevator means is at its normal down position. Attached to the elevator table at each end of the transverse members are retractable lug means generally indicated in this drawing as 62. In order to avoid crowding, only one is indicated by number on the drawing. These are shown in detail in FIG. 10. Also shown in the general view are the elevator table tray stop means generally indicated as 64. This means is shown here only on the right-hand side of the elevator table. Normally a similar stop means would be in an equivalent position at the left-hand side of the elevator table. This too was omitted to avoid confusion in the drawing. Finally, a tray-stop means 66, 67 is indicated as attached to upper corner post 45. It is shown in more detail in FIG. 11. Again, for the sake of simplifying this drawing, this means is shown only on upper corner posts 45 and 46, but they would normally be located in a similar position on the other two corner posts as well.

Looking now at FIGS. 2 through 6, a typical greenhouse tray that might be handled by the apparatus is shown. These again are well known in the art and form no part of the present invention. The trays are normally a lightweight aluminum weldment and are generally indicated at 68. They are comprised of transverse rails 69, 70 and longitudinal rails 71, 72. Across the bottom section of the tray five T-rails are shown as 73, 74, 75, 76 and 77. One of the transverse rails is shown in cross section in FIG. 3. These are normally extruded aluminum and comprise an upper external groove 78 and a lower internal slot defined by fins 79 and 81. The floor 80 of the tray usually comprises a lightweight material such as foamed polystyrene which is supported on the flanges of the T-rails. Such a rail is shown in cross section in FIG. 4 as 74. These rails may have a T-slot 83 formed into their structure when they are extruded or fabricated. The trays are normally supported on the rail system by four rollers. Two of these are plain flat rollers generally shown as 81 in FIG. 5. T-bar 73 has keyed into it T-headed roll holder 84 carrying roller 85. This is shown riding on one of the pipe rails 33. The other pair of rollers are normally in an inverted Y form generally shown as 82 in FIG. 6. Here roll holder 87 is fixed into T-bar 77. Rollers 89 and 91 are shown riding on pipe rail 35. The inverted Y arrangement is used to prevent lateral movement as the trays roll along the rails in the greenhouse.

Turning now to FIGS. 7 and 8, a top view is given of the arrangement for rotating the upper corner posts. This rotation is necessary because the tray-retaining means 58, 59, 60, 61 in their normal position would prevent entry or exit of a stack of trays. They must therefore be rotated or otherwise moved out of the way so that such entry or exit can take place. FIG. 7 shows the tray-retaining means 60 in a normal position when trays are being accumulated or dispensed. Lug lip 127 is shown engaged in a phantom slot 78 of tray 68. Rotation of upper corner post 68 is accomplished by handle 56 attached by hinge 93 to rod 94 which is welded or otherwise fixed into the corner post. The hinge permits the handle to be folded up and out of the way when not in use. It may also be engaged into a locking mechanism, not shown, to prevent accidental movement of the upper corner posts. Lever arm 98 is likewise fixed into the corner post. It is connected by pin bolt 100 to connecting linkage 54 which ties upper corner post 48 to its counterpart 46. The linkage can be adjusted by the screw and nut means 102.

FIG. 8 is a similar view but there are corner post is rotated out of the way of an entering or leaving stack of trays. In this case the tray-retaining means 60 is 90 degrees from its previous position. The stack of trays, indicated by the phantom outline 104, can now roll past the tray-retaining means into or out of the apparatus.

While in the embodiments shown the corner posts rotate to move the tray-retaining means out of the way of a stack of trays, it is equally within the scope of the invention for the retaining means to be attached to hinged upper corner posts or to an arrangement which would translate them out of the way of an incoming or outgoing stack of trays.

FIG. 9 shows the detail of the mechanism of the elevator table tray-stop means. One of these is normally used on each side of the elevator table to prevent trays from accidentally rolling off when the elevator is being raised or lowered. Here a tray is generally indicated as 68 and is retained by stop arm 106. The stop arm is pivoted about support member 108 on pivot bolt 110. The support member would normally be welded to elevator table transverse member 22. The stop arm is biased into a normally upward position by spring 111. When the elevator table is in its normal position; i.e., in line with the external rail transport system, it is desirable for the elevator stop means to be out of the way so that the trays may move freely over the rails. This is accomplished by push rod 112 which bears against lower frame member 6 or 7 when the elevator table is dropped to its lower position. The height of the push rod is adjusted by a bolt and nut arrangement 114. The push rod travels within a pipe bearing 118 and is retained at the top by collar 116. The dotted view shows the position of the push rod and the stop arm when the elevator table is in its normal position.

FIG. 10 shows the detail of the retractable lug means shown generally as 62 on FIG. 1. It consists of a movable lug 180 telescoping into elevator transverse member 23. The end of the movable lug has a raised contacting surface 181. The lug is locked into one of two positions by T-handled stop device 182. This comprises a rod which drops into positioning hole 192 or 194 of the movable lug 180. The T-handle is retained within a structure comprising nipple 184, normally welded to the elevator transverse member 23, and cap 186. The middle portion of the T-handled stop bears pin 190 which serves as a lower retainer for light spring 188. Cap 186 serves as the upper retainer for this spring. The function of this lug means is to releasably operate the tray-retaining means when it is desired to dispense a tray for subsequent use. As will be described in more detail later, the retractable lug is in the extended position shown in FIG. 10 when dispensing trays and in the withdrawn position when the apparatus is accumulating and stacking trays.

Figure 11:
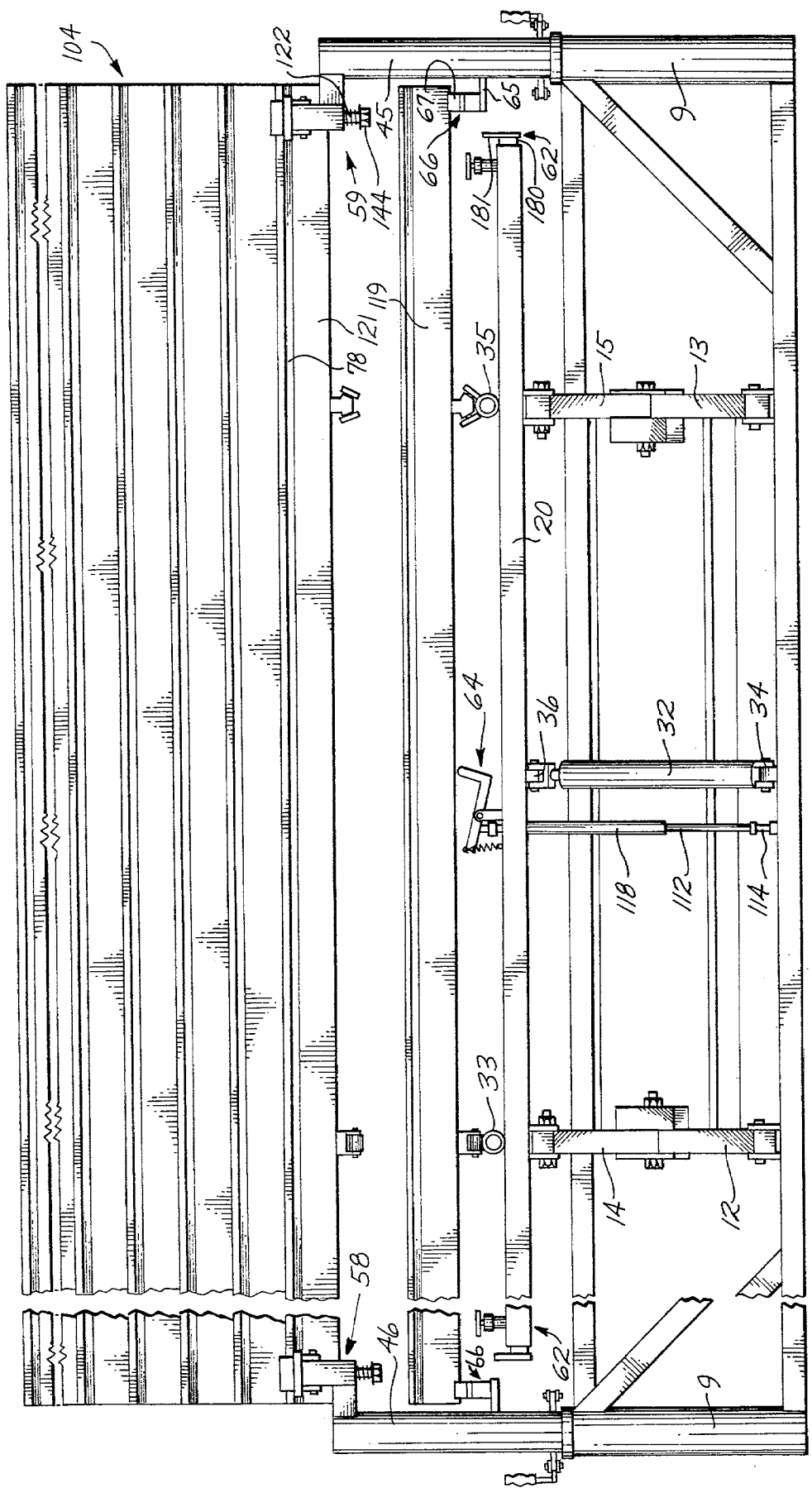
FIG. 11 is an end view in elevation of the accumulating and dispensing apparatus with a stack of stored trays in place and a new tray about to be added to the stack.
Figure 12:
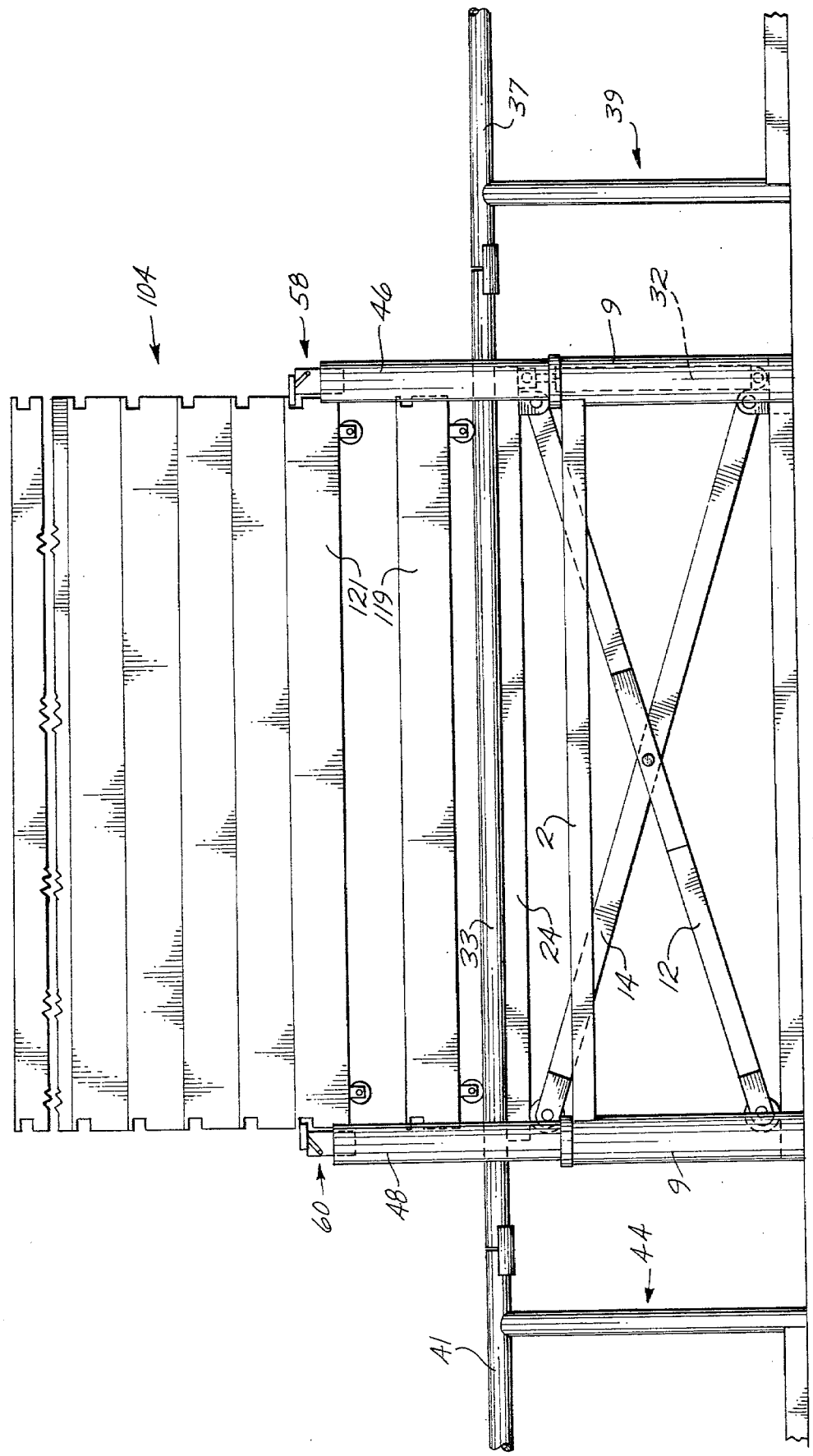
FIG. 12 is a side view in elevation similar to FIG. 11.

Looking now at FIGS. 11 and 12, rear and side elevations of the apparatus are shown. In FIG. 11 the apparatus is in position for stacking trays which are entering toward the observer. Tray 119 has just entered along rails 33 and 35. The tray advances across the elevator until it meets the stops generally indicated as 66. These comprise a strut 65, fixed to the upper corner post and a stop block 67 which is attached to the strut by bolts or in some other fashion so that it can be readily removed. These blocks are used when the apparatus is receiving and stacking trays but they are taken off when the apparatus is dispensing trays one at a time. In similar fashion, the retractable lugs 180 are withdrawn as shown into the transverse member 20 of the elevator table so that the contacting surface 181 does not actuate the head 144 of the retaining means when the elevator is raised. The retractable lugs are extended only when the apparatus is dispensing trays. Stop block 67 may conveniently have a resilient surface or a light spring in the area that contacts the trays in order to reduce shock from rapid deceleration. In the view shown in FIG. 11 the elevator tray stop means 64 in the down position. When the elevator is raised in order to stack tray 119 the stop arms will come up to prevent the tray from rolling off the rails of the elevator table. Tray 121 is presently held in position by the tray-retaining means, in this view generally indicated by 58 and 59, which are engaged into slot 78. The trays above this, generally indicated as 104, simply rest by gravity upon the lowest tray in the stack. In order to add tray 119 to the bottom of the stack the elevator is simply raised. As will be described in detail later the lip portion of the locking lugs will merely ratchet out of the grooves in tray 121 and snap into the grooves of tray 119 when it is in the proper position. The tray being thus held, the elevator is lowered to the neutral position to receive the next incoming empty tray.

Presuming for the moment that the stop blocks 67 were removed and the lugs 180 were in the outward position, one can assume that tray 119 has just been removed from the bottom of the stack and is about to be dispensed for use. In this case tray 121 will be the next tray to be dispensed. When tray 119 has been rolled out of the apparatus the elevator is again raised and the contacting surface 181 of the retractable lugs 180 engages the adjusting bolt 144 of push rods 122 of the tray-retaining means. Raising the elevator toward the top of its stroke, the locking lugs are withdrawn from grove 78 and are maintained in the withdrawn position while the elevator is lowered with tray 121 now resting on rails 33, 35. As this happens, the entire stack of trays will also be lowered. However, the locking lugs of the tray retaining means will snap into the groove of the tray immediately above tray 121 and that tray and the rest of the stack above it will be retained. When the elevator again reaches its normal position, tray 121 can be simply rolled off onto the auxiliary transportation system.

Figure 13:
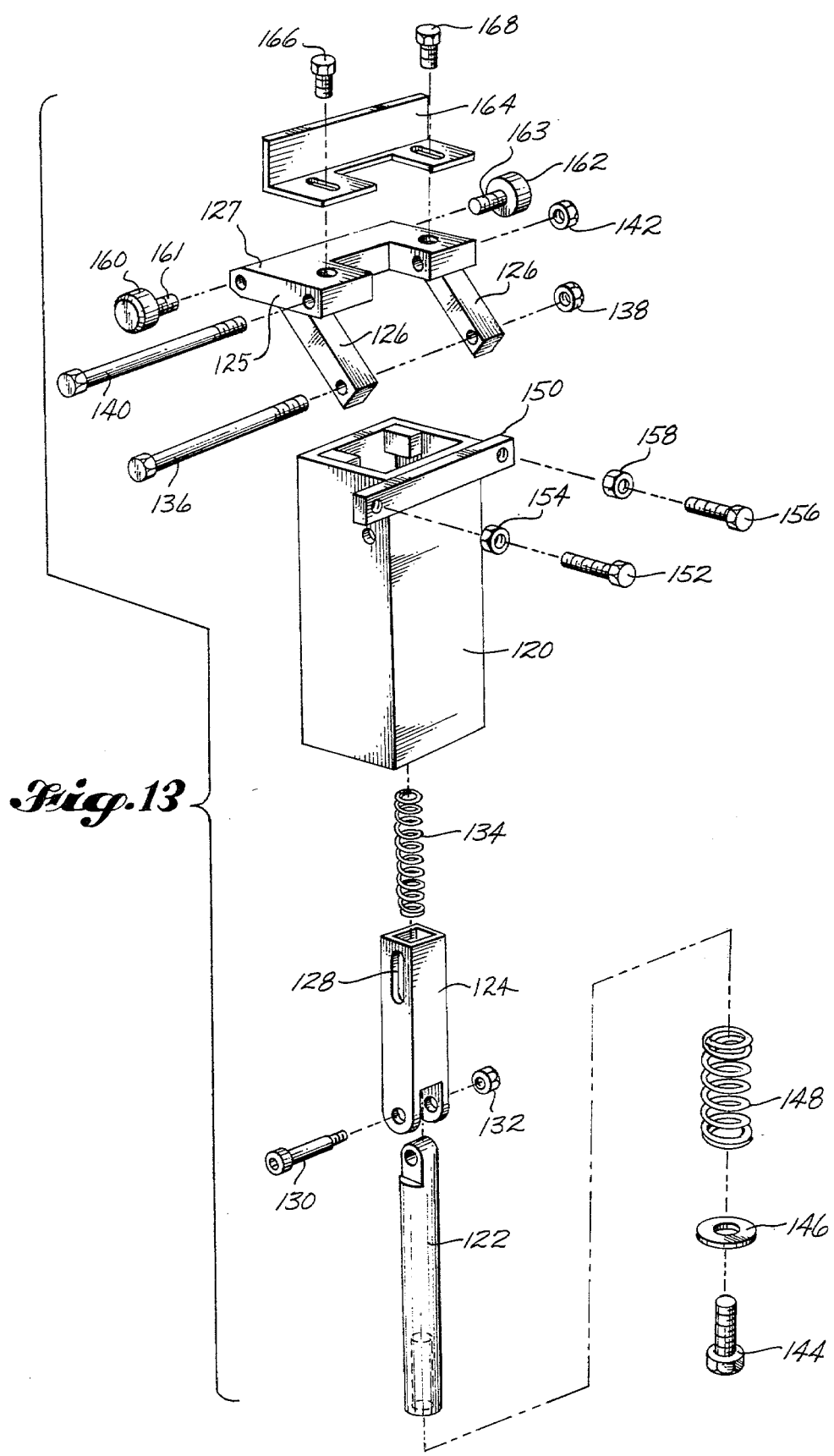
FIG. 13 is an exploded view of the tray retaining means.

The mode of operation of the tray-retaining means is a key part of the apparatus. Construction is best seen by referring to FIGS. 13 and 14 while operation is explained sequentially in FIGS. 15 through 18. Looking now at the exploded view in FIG. 13, a support frame 120 is provided which may conveniently be made of square metal tubing. Toward the bottom of the drawing is a first shaft means or push rod 122. This is articulated at the proximal end with a second shaft means or square tube 124 by pivot pin 130 which is retained by lock nut 132. At the upper part of the drawing, locking lug 125 has fixed to it a pair of pivot arms 126. It also contains a lip portion 127 which is the part of the locking lug which engages the grooves in the trays. The second shaft means 124, in this case a piece of square metal tubing, contains at its proximal end a longitudinal slot 128. This is movably pinned to the locking lug by thin bolt or shaft slot pin 140 which passes through slot 128 and is retained by locking nut 142. A second spring means 134 is contained within square tube 124 and acts at its distal end against pin 130 and its proximal end against shaft slot pin 140. Both pins in this case serve as spring stops. Locking lug 125 is pivotally attached to the support frame 140 by pivot pin 136 which is retained by locking nut 138. Looking again at the lower portion of the apparatus, length adjustment bolt 144 is threaded into push rod 122 and may be used for making minor adjustments so the locking lugs in the tray-retaining means on each corner post act simultaneously. Washer 146 serves as a lower retainer for the first spring means, or mainspring, 148. The upper retainer for this is not visible in FIG. 13 but is seen in FIG. 14 as a vertical sleeve bearing 170 which is fixed to the support frame 120 by strut 172. Bearing 170 may simply be a short piece of pipe or tubing and need not have a close tolerance fit with push rod 122. Stop bar 150 is mounted at the top or proximal portion of the frame. It is convenient to insert cap screws 152, 156 whose length is adjusted by spacer nuts 154, 158. These serve as stops to bear against the heel of locking lug 125 and prevent overtravel. Friction with the tray slots may be reduced by the use of rollers 160, 162 which are fixed on either side of lip portion 127 of locking lug 125 by short bolts 161 and 163. An optional part of the tray-retaining means is the angled alignment plate 164 which is bolted to the top of the locking lug by short cap screws 166, 168. This alignment plate serves principally to bring the tray above the one which is retained by the locking lugs into proper register.

FIG. 14 is a partially cutaway view of the tray-retaining means, showing it assembled and in position on corner post 46.

Referring now to FIGS. 15 through 18, the sequence of releasing a tray from storage to the elevator will be reviewed. In each of these four figures view A was taken at 90 degrees to view B and shows the position of roller 85 and its associated tray 196 relative to rail 33 on the elevator table. View B is a partial sectional view showing the operation of the tray-retaining means at various stages of releasing a tray.

In FIG. 15 the operation is just beginning. The elevator table is rising and the lugs 180 are in extended position to contact the adjusting bolt 144 at the distal end of the push rod or lower shaft means 148. Tray 196 is retained by the lip of the locking lug, shown in this view by roller 160, which is in place in tray groove 198. Note that pin 140 is at the upper or proximal end of slot 128 in the square tube or second shaft means. Second spring means 134 is under light compression so as to hold the pin at the upper part of the slot under no-load conditions of the tray-retaining means.

As now seen in FIG. 16 the contacting surface 181 of lug 180 has hit adjusted bolt 144 and begun to compress both the first spring means 148 and the upper or second spring means 134. Note that the square tube 124 has risen and the pin 140 is now at the bottom or distal end of slot 128. To this point in time the weight of the trays has kept locking lug 125 in its original position. In view A of FIG. 16 note that rail 33 is just about to contact roller 85 at the time pin 140 bottoms in slot 128. This ensures that the tray stack will be supported when the lug 125 is released from tray slot 198. When pin 140 bottoms in slot 128, the first and second shaft means act as a rigid body and further upward movement will begin to rock the locking lug 125 back around pivot point 136. This is seen in FIG. 17. Spring 148 has now approached full compression and the elevator has raised the lower tray 196 sufficiently so that the locking lug 125 has now moved backward out of groove 198. At this point in time the elevator is reversed and the trays begin to drop. It is essential that the locking lug stay out of engagement from groove 198 until the groove has dropped below the resting plane of the lug. This is the function of the arrangement with spring 134, slot 128, and pin 140. Looking at FIG. 18 the tray stack has now dropped and groove 198 is well below the plane of the locking lug. As the contacting surface 181 of the movable lug 180 moves downward, both springs begin to relax. Since locking lug 125 is no longer bearing the weight of any trays, spring 134 is free to expand and it again forces pin 140 up to the top of slot 128. In the early stages of downtravel this will hold lug 125 in the retracted position for a sufficient period of time for groove 198 to drop clear. After contacting portion 181 of movable lug 180 has fallen out of contact with the adjusting bolt 144, the rollers 160 on the lip of locking lug 125 will then roll along the side of tray 200 until the stack has dropped sufficiently for the groove in tray 200 to present itself to the locking lugs. The locking lugs will then snap into this groove as it appears and retain not only tray 200 but any trays that might be stacked above it.

Figures 18A, 18B:
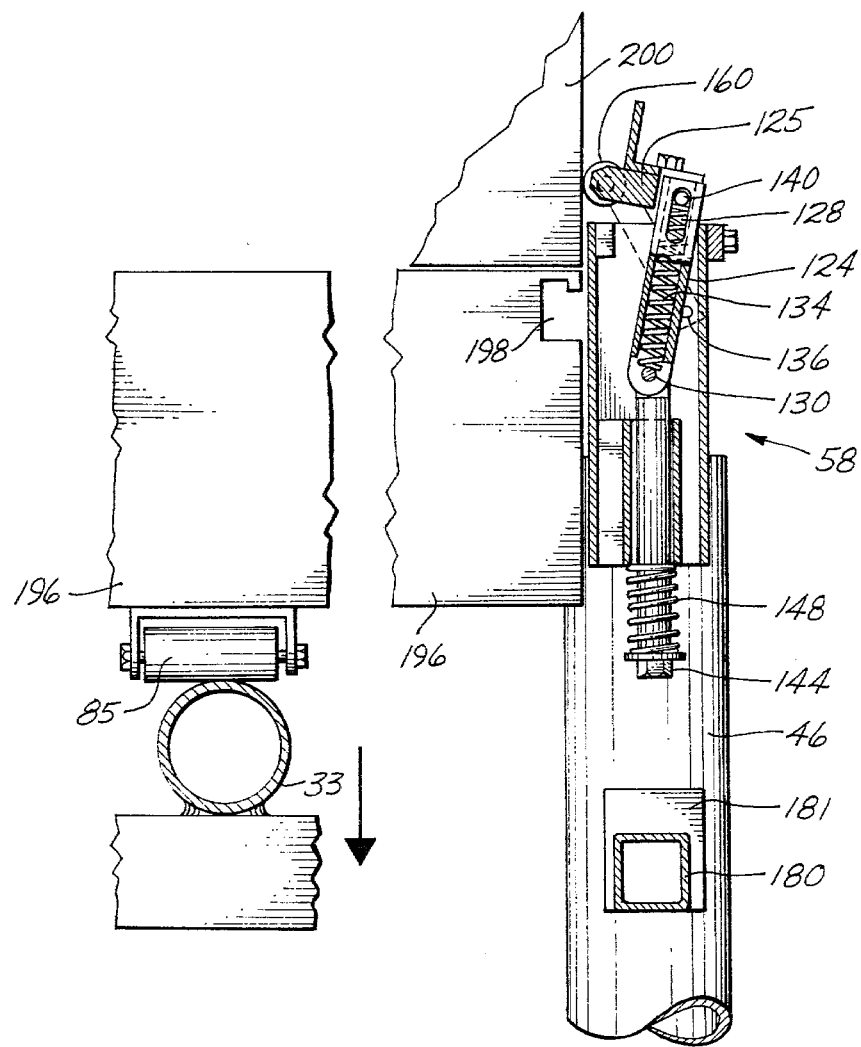
FIGS. 18A and 18B are a pair of views similar to FIG. 15 in which the released tray is being lowered to a delivery position and a new tray is dropping into place to be held by the retaining means.

FIG. 18 can also be used to illustrate how trays are accumulated on the bottom of a stack. In this case lug 180 with its contacting surface 181 is withdrawn so it does not contact bolt 144. As a new tray is raised on the elevator to be added to the stack it will first contact the bottom of the lowest stored tray; i.e., the one which is retained by the locking lugs. As the trays are further raised the locking lug 125 will simply act as a ratchet pawl against springs 134 and 148 and roll out of the groove where it will be in position to snap into the upcoming groove and retain the newly added tray.

The normal mode of operation of the apparatus will be either to receive trays, as for example at the shipping end of the greenhouse, or to dispense them as, for example, at the planting end. It is equally permissable that the apparatus could be used somewhere in the middle of a tray-receiving line to accumulate an inventory of trays coming from one direction and then to dispense them as needed downstream on the transport system. In the most typical cycle assume, for example, that at the shipping end of a greenhouse a stack of trays has been accumulated on the apparatus and that these are now to be transported by some conventional means to the other end. To discharge the load of trays from the apparatus, normally the elevator is run up until it supports the weight of the entire stack and then the upper portion of the corner posts containing the tray retaining means is rotated or otherwise moved out of the way as was described earlier. The entire stack of trays is then lowered by the elevator to rail level where it is rolled out onto another conveyance that will bear the entire stack to the other end of the line. At the receiving end, where trays are to be dispensed one by one, the operation will proceed in reverse to that just described. The upper corner posts with their integral tray-retaining means will be opened outward so the entire stack of trays can be moved into the apparatus. The posts will then be rotated into their closed positions and the elevator raised so that the next to the lowest tray is locked into the tray-retaining means. The elevator, still carrying the lowest tray, is now dropped and this tray is ready to be dispensed. It is understood, as explained before, that the stop means 66 and the retractable lug means 62 will be in their appropriate positions for either accumulating or dispensing trays.

Having thus described in detail the construction and operation of the invention, it should be apparent to one skilled in the art that many modifications can be made that would still be within the scope of the disclosure. The invention should thus be considered to be limited only by the scope of the following claims.

We claim:

1. Apparatus for accumulating and dispensing shouldered trays traveling on a conveyor system which comprises:
   a. a supporting frame;
   b. elevator means for raising incoming trays from a receiving position to a storage position and lowering outgoing trays from a storage to a dispensing position, said elevator means having transport means compatible at a normal position of the elevator means with the adjacent conveyor system so as to allow movement of trays into and out of the apparatus;
   c. a plurality of tray-retaining means, each mounted on rotatable post means held in the frame, each retaining means engageable with the tray shoulders so as to releasably support the lowest tray in a stored stack, said means acting in ratchet fashion from tray shoulder to tray shoulder to allow free upward passage of trays as new trays are added to the bottom of an accumulating stack, said means being mounted so as to allow clearance under any stored trays for at least one tray on the transport means when the elevator means is at its normal position;
   d. biasing means holding the tray-retaining means at their tray retaining position;
   e. disengaging means operatively associated with the tray-retaining means so as to release on demand the lowest tray in a stored stack onto the elevator means; and
   f. means for rotating the tray-retaining means out of the path of entering and leaving stacks of trays.

2. The apparatus of claim 1 in which the disengaging means for each individual tray retaining means is a retractable lug mounted on the elevator table.

3. The apparatus of claim 2 in which when trays are being dispensed the lugs contact the tray-retaining means when the elevator means is raised and cause them to withdraw from the tray shoulders at the time the tray becomes supported on the elevator means, said lugs further holding the tray-retaining means in withdrawn position until the elevator has lowered said tray below said retaining means so that the tray can be dispensed.

4. The apparatus of claim 2 in which the disengaging lugs are retracted out of contact with the tray-retaining means when trays are being stacked.

5. The apparatus of any of claims 1 to 4 in which stop means are moved into place when the elevator means is above normal position so as to counteract any tendency for trays to roll off the elevator means.

6. The apparatus of claim 1 in which the elevator means is a scissors lift.

7. The apparatus of claim 1 in which the tray-retaining means comprises:
   a. a support frame having upper and lower ends;
   b. a vertically oriented bearing fixed to the frame;
   c. first shaft means slidable through the bearing;
   d. first biasing means acting to bias said shaft means downward;
   e. a shoulder engaging lug means pivotally mounted at its proximal end to the upper end of the frame;
   f. second shaft means pivotally pinned at its lower end to the upper end of the first shaft means, said second shaft means having an elongated longitudinal slot at its upper end;
   g. transverse pin means fixed to the lug means and slidably retained in the longitudinal slot of the second shaft means;
   h. second biasing means acting to normally bias the transverse pin means to the proximal end of the slot in the second shaft means so that the shoulder engaging lug may act as a ratchet pawl working against the spring means to permit upward movement of trays as new trays are added from below.

8. The tray-retaining means of claim 7 in which the disengaging means acts against the distal end of the first shaft means to pivot the slot engaging lugs out of the tray slots to release the tray and the second spring means holds said lug out of the way to allow the tray to descend without said lug reengaging said tray slot.

* * * * *